United States Patent
French

[11] 4,049,413
[45] Sept. 20, 1977

[54] METHOD FOR MAKING OPTICAL FIBERS WITH VARIATIONS IN CORE DIAMETER

[75] Inventor: William George French, Plainfield, N.J.

[73] Assignee: Bell Telephone Laboratories, Incorporated, Murray Hill, N.J.

[21] Appl. No.: 697,931

[22] Filed: June 21, 1976

[51] Int. Cl.² ............................................. C03B 37/00
[52] U.S. Cl. .......................................... 65/3 A; 65/4 B; 65/13; 65/18; 65/31; 65/61; 65/DIG. 7; 350/96 WG; 427/163
[58] Field of Search .................. 427/163; 65/3 A, 4 B, 65/18, DIG. 7, 2, 13, 61, 31; 350/96 GN, 96 WG

[56] References Cited
U.S. PATENT DOCUMENTS

| | | | |
|---|---|---|---|
| 3,666,348 | 5/1972 | Marcatili | 350/96 WG |
| 3,687,514 | 8/1972 | Miller | 350/96 WG |
| 3,782,914 | 1/1974 | Deluca et al. | 65/3 A |
| 3,891,302 | 6/1975 | Dabby et al. | 350/96 WG |
| 3,909,110 | 9/1975 | Marcuse | 350/96 WG |
| 3,912,478 | 10/1975 | Presby | 65/DIG. 7 |
| 3,922,062 | 11/1975 | Uchida | 350/96 WG |
| 3,932,160 | 1/1976 | Camlibel et al. | 65/3 A |
| 3,981,705 | 9/1976 | Jaeger | 65/13 X |

OTHER PUBLICATIONS
Won-Tien et al. Applied Physics Letters vol. 27, No. 11, Dec. 1, 1975, pp. 588–590.
Stanley et al. Applied Physics Letters vol. 24, No. 8, Apr. 15, 1974 pp. 380–382.

*Primary Examiner*—Robert L. Lindsay, Jr.
*Attorney, Agent, or Firm*—Peter V. D. Wilde

[57] ABSTRACT

A method is disclosed for producing optical fibers which are drawn with diameter variations in the transmitting core but with uniform overall diameter. In this process the glass starting member used in fabricating the optical fiber preform is etched with appropriate grooves. Additional glass is subsequently deposited on the etched starting member, and a fiber is drawn from the preform so fabricated.

12 Claims, 11 Drawing Figures

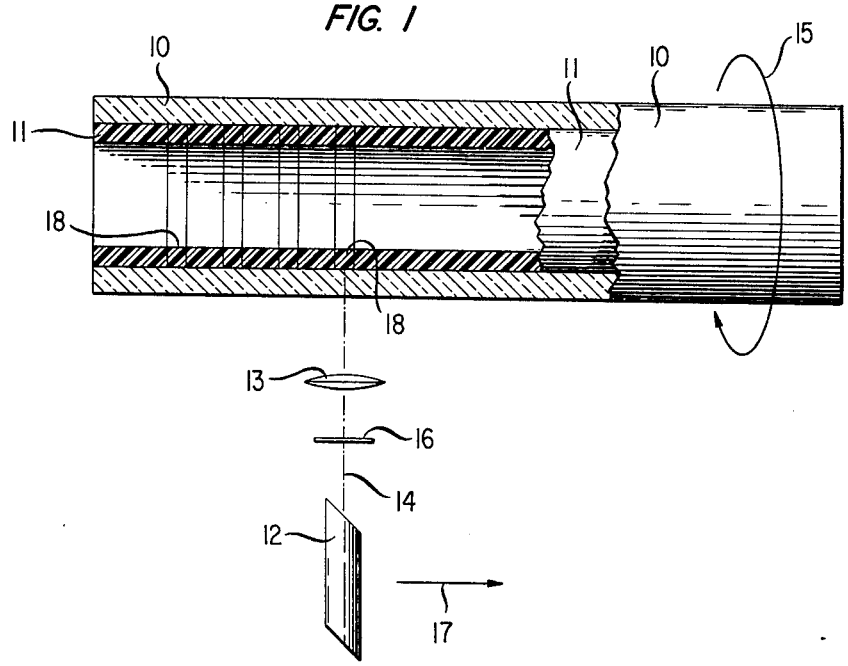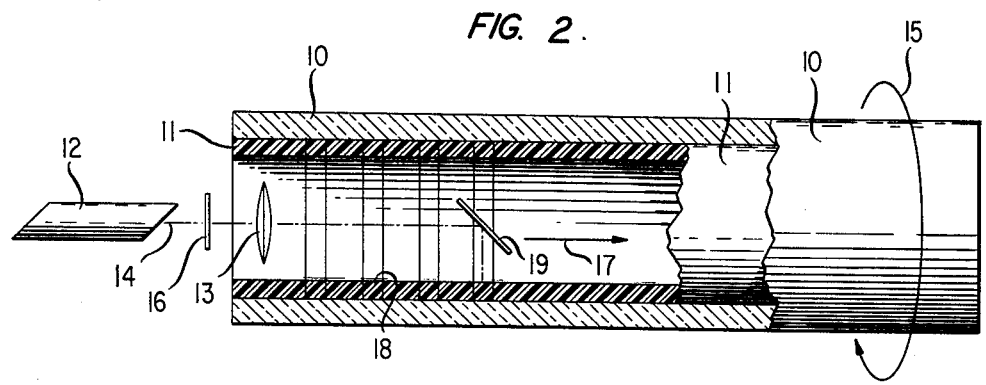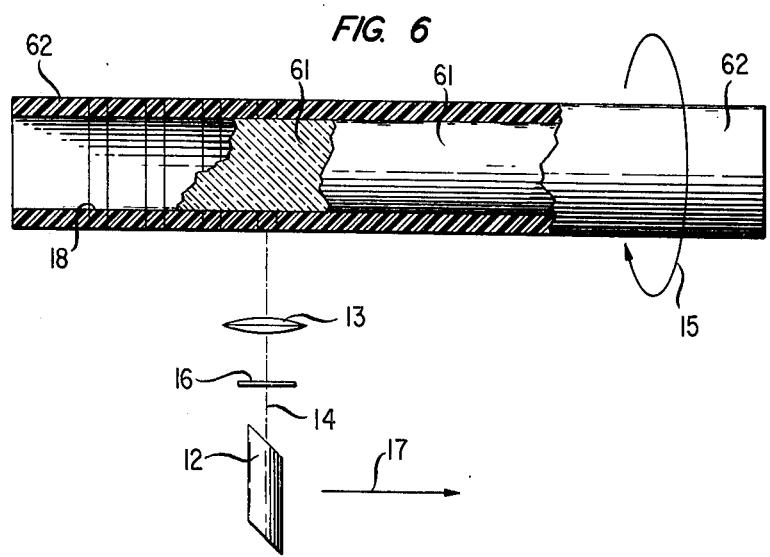

METHOD FOR MAKING OPTICAL FIBERS WITH VARIATIONS IN CORE DIAMETER

BACKGROUND OF THE INVENTION

1. Field of the Invention

This invention is a technique for producing clad optical fibers with diameter variations in the core material but with uniform overall diameter. Such fibers exhibit enhanced mode mixing properties and hence reduced mode dispersion, yet do not have the disadvantages associated with fibers having overall diameter variations.

2. Description of the Prior Art

The obvious advantages of optical transmission have resulted in significant efforts to develop this field of technology, despite the fact that the optical signal must still be transformed to an electronic one for conventional electronic processing. The overriding advantages of optical communications include larger bandwidth and significantly smaller cable size. In conjested urban areas where underground duct room is rapidly being depleted, optical transmission provides a means for increasing capacity within the given physical area available.

While the transition to optical communication systems is inevitable, significant hurdles remain to be overcome. For example, the desire to transmit information in digital form, when combined with the economic pressures which favor the use of multimode fibers, places severe restrictions on the amount of mode dispersion which can be tolerated. This application is addressed to an improved technique for the fabrication of optical fibers with reduced mode dispersion.

The mode dispersion effect may be most readily understood in terms of the various possible paths by which a given light ray may traverse an optical fiber. The ray, for example, may be transmitted directly down the center of the fiber, or may reflect off the fiber walls any given number of times. Each of these possible paths has associated with it a different path length and hence a different traversal time. In a multimode fiber which can simultaneously support a multitude of modes, the width of a given light pulse is increased due to this nonuniform traversal time. Similar effects are associated with material dispersion phenomena but, at least for narrow wavelength sources, are overshadowed in severity by the above-described mode dispersion.

Initial attempts directed towards limiting mode dispersion involved the fabrication of single mode fibers. Since such fibers can support only a given single mode, there is clearly no pulse width degradation associated with different traversal times of different modes. Only one mode may traverse the fiber and it has a well defined traversal time. However, difficulties in launching light into such fibers, and a desire to use incoherent light for which such single mode fibers are inefficient, restrict the applicability of single mode fibers.

In multimode fibers the mode dispersion effect may be reduced by tailoring the material composition cross-section so that long path length modes have higher velocities. In such a fiber, all modes have approximately the same traversal times. A technique for fabricating such fibers is disclosed in U.S. Pat. Nos. 3,823,995 and 3,826,560.

In an article by S. D. Personic in the *Bell System Technical Journal*, Vol 50, No. 3, Mar. 7, 1971, page 843, an alternative technique for alleviating mode dispersion effects is suggested. Personic shows that while the pulse broadening associated with mode dispersion increases proportionately with the length of the fiber, efficient intentional mode conversion results in a broadening effect which is proportional only to the square root of the fiber length. Stimulated by this finding, numerous studies were made to determine the most effective technique for enhancing mode conversion. One particular method involves the introduction of longitudinal gradations in the index of refraction of the fiber. It has been found that to maximize mode mixing while maintaining radiation loss mechanisms within tolerable limits, the spatial periods of such gradations in the fiber must be approximately between 1 and 10 millimeters for transmitted light in the visible and near visible regions of the spectrum. Further reduction in radiative losses may be realized by introducing radial, longitudinal and azimuthal variations in index of refraction as discussed in U.S. Pat. No. 3,909,110.

In U.S. Pat. Nos. 3,666,348 and 3,687,514, it is shown that the introduction of diameter variations in the optical fiber transmitting core accomplishes the same efficient mode conversion as do longitudinal variations in the index of refraction. In a commonly assigned U.S. Pat. No. 3,912,478, a technique is presented for introducing such diameter variations after the drawing process. However, the fiber drawn according to the teachings in that patent either has overall diameter variations or must be subsequently clad.

SUMMARY OF THE INVENTION

In this invention a clad optical fiber is drawn with diameter variations in the transmitting core but without any overall diameter variations. In this technique the preform from which the optical fiber is drawn is fabricated using a cylindrical glass starting member. This starting member is etched with appropriate grooves. Additional glass is subsequently deposited on the starting member. The additional glass may be deposited using the prevalent glass soot deposition, chemical vapor deposition or modified chemical vapor deposition processes. In either case the preform so fabricated and the fiber drawn therefrom have a uniform external diameter but diameter variations in the transmitting core.

BRIEF DESCRIPTION OF THE DRAWING

FIG. 1 is a schematic representation of an apparatus to carry out the initial steps of this invention when a hollow tubular starting member is used;

FIG. 2 is a representation of an alternative means for carrying out the initial steps in this invention;

FIG. 6 is a schematic representation of an apparatus which may be used to carry out the initial steps of this invention in conjunction with a solid rod starting member;

DETAILED DESCRIPTION

Figure 3:
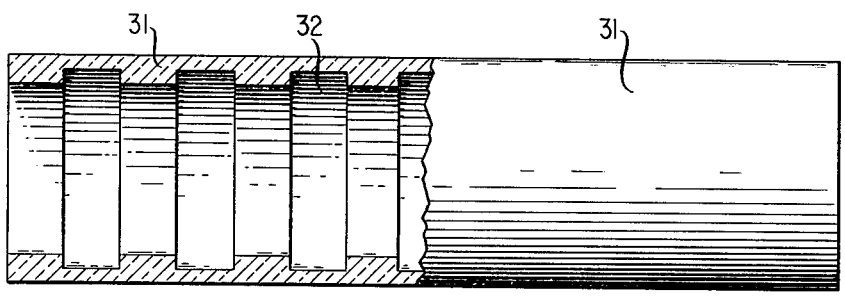
FIG. 3 is a representation of a hollow glass tube on the interior of which grooves have been defined according to the teachings of this invention.

In the practice of this invention an optical fiber is drawn with diameter variations in the transmitting core but with a uniform overall diameter. Such a fiber displays enhanced mode conversion and hence minimized mode dispersion. The uniform overall diameter alleviates those difficulties normally associated with fibers of nonuniform diameter. The particularly significant aspect of this invention is that the fiber, as pulled, has a core with the requisite diameter variations while at the same time having a uniform exterior diameter. The fabrication process requires no intermediate step in which an optical fiber of varying overall diameter must be clad to yield a uniform external diameter fiber.

The uniformity of the external diameter of the optical fiber is defined by the absence of diameter variations of period greater than 0.01 mm whose rms value is greater than 5 percent of the overall fiber diameter. On occasion nonperiodic diameter variations may exceed this value, but such variations have less effect on the efficient mode conversion between nonradiating modes of the fiber. Very low or very high period variations may form a significant portion of the fourier spectrum of diameter variations. However, periodicity of interest for mode conversion in the instant fibers is from 0.5 millimeters to 50 millimeters and lies between the above-mentioned extreme regions of the fourier spectrum.

There are currently two major techniques for producing preforms from which optical fibers are drawn. The first technique involves glass deposition on the interior of a hollow glass tube. This deposition may proceeed by means of the chemical vapor deposition technique (French et al., Appl. Phys. Lett. 23, (1973) p. 338), the modified chemical vapor deposition technique (MacChesney et al., Proc. 10th Int'l. Cong. on Glass, Kyoto, Japan, (1974) p. 6–40) or the soot process (U.S. Pat. Nos. 3,659,915 and 3,737,293). The deposited glass may utimately form the transmitting core of the fiber. The second preform fabrication technique involves glass deposition on the external wall of a solid cylindrical rod. The rod may ultimately form the transmitting core of the fiber. The instant invention may be practiced in conjunction with either of these techniques.

FIG. 1 is a schematic representation of an apparatus which may be used to perform the initial steps of this invention when the starting member is a hollow glass tube. The apparatus shown in FIG. 1 enables the practitioner to define grooves on the interior of the hollow glass tube thus yielding the grooved structure shown in FIG. 3.

The grooves are approximately perpendicular to the axis of the cylindrical starting member rather than parallel to it and circle the starting member. In one embodiment, the position of the grooves may be defined by the intersection of the starting member surface with planes perpendicular to the starting member axis. In another embodiment, a single helical groove is etched. The periodicity of the grooves, or alternatively the pitch of the helix, is determined by the requirement that the diameter variations in the fiber have a periodicity on the order of from 0.5 to 50 millimeters. The requisite spacing on the preform will then be determined by the above fiber specification and the pulling ratio, R. R is defined as the ratio between the length of the fiber and the length of the preform from which it is pulled. The appropriate groove spacing on the preform is then given by the desired spacing on the fiber divided by the pulling ratio.

Other fiber specifications will depend upon the particular application envisioned. The interrelationship between the various fiber specifications, and hence particular subsets of possible fiber specifications, cannot be stated analytically. However, the probable ranges of individual specifications may be stated with the proviso that the exact value of a given specification in a particular embodiment will be dependent in part on the values of the remaining specifications.

The transmitting core of the fiber comprises glass of transmission loss generally less than 50 db/km in the range of electromagnetic wavelengths generally from 0.3 to 20 microns. Higher losses may be tolerated for shorter distance application, while losses of less than 10 db/km may be desired to increase repeater spacing in long distance applications. Narrow wavelength sources permit the use of glass with higher losses in regions of the spectrum outside that of the source. The fiber cladding has an index of refraction less than that of the core. For multimode fibers, such as those described herein, the relationship between the transmitted wavelength $\lambda$, the index of refraction of the core $N$, and the core radius $r$ is given by $$(2\pi/\lambda) N r \sqrt{2\Delta} > 2.405. \qquad (1)$$

In this formula, $\Delta$ is the difference between the indices of refraction of the core and the cladding divided by the index of refraction of the core.

The pulling ratio is generally within the range of 1,000 to 100,000. However, specialized applications may be commercially viable with lower pulling ratios and technical developments may permit even greater pulling ratios than that specified.

In this invention the fiber, as drawn, has an overall diameter whose uniformity is limited only by the particular drawing process used. Overall diameter variations of less than 5 percent may be attained using the laser drawing process described in U.S. Pat. No. 3,865,564. The outside diameter of a preform from which a multimode fiber is pulled is generally from 3 to 30 millimeters while the diameter of the transmitting core is given by equation 1 and the polling ratio. The variation in the diameter of the transmitting core required to enhance mode conversion is generally between 0.01 percent and 1 percent of the core diameter. If the grooves are defined by chemical etching then they will have an aspect ratio (width divided by depth) greater than or equal to 1. However, other etching processes, such as laser etching processes, will yield aspect ratios of less than 1.

In FIG. 1, 10 is the hollow glass tube starting member and 11 is a layer of resist which is deposited on the interior of the glass tube. This resist may be any one of the common resists such as photoresist, either positive or negative, or electron-beam resist, either positive or negative. In FIG. 1, 11 represents an exemplary photoresist. Twelve is a source of light capable of exposing the photoresist 11. Twelve may be a source of either coherent or incoherent light. Thirteen is an optional focusing device to further define the light at the resist 11. The light 14 is thus guided from the source 12 through the wall of the tube 10 to the resist 11 thereby exposing it. During the exposure a means 15 rotates the tube 10 so as to yield an appropriately exposed region. Subsequent to the exposure a means 16 is used to turn the light off, and a means 17 translates the light beam to a new position on the resist 11. If a helical pattern is desired the exposure continues during the translation. The means 17 may translate the source of light 12, or alternatively a focusing means may be used to redirect the light without moving the source 12. The exposed regions on the resist are represented by the shaded area 18. After the resist is sufficiently exposed so as to yield the requisite exposure configuration, the resist is developed and removed according to the practices well known to practitioners of resist technology. Depending upon whether the resist is a positive resist or a negative resist, either only the exposed or only the unexposed regions will be removed. The instant invention may be practiced with either of these resists as long as the exposed regions are sufficiently defined so as to yield the requisite grooved structure shown in FIG. 3. After development and partial removal of the resist, the underlying glass is etched. During this etching process, that portion of the resist which remains after the first resist removal step, acts as an etchant mask for portions of the interior glass wall. Consequently, only those parts of the wall from which the resist has been removed will be etched. Subsequent to the etching, the additional resist is removed and the structure shown in FIG. 3 results. In FIG. 3, 31 is the glass starting member and 32 represents the etched grooves. The techniques for exposure, initial removal and final removal of the resist are well known to practitioners in the photoresist and electronresist arts.

FIG. 2 is a representation of an alternative apparatus for producing the structure of FIG. 3. Like reference numerals in FIG. 2 refer to like elements in FIG. 1. In FIG. 3 the light is guided down the center of the tube and then directed toward the resist by means of a reflecting device 19. Exposure of the resist and formation of the grooves proceeds in FIG. 3 in a similar manner to that shown in FIG. 1. The specific technique for producing the structure of FIG. 3 is not critical to the practice of this invention.

Figure 4:
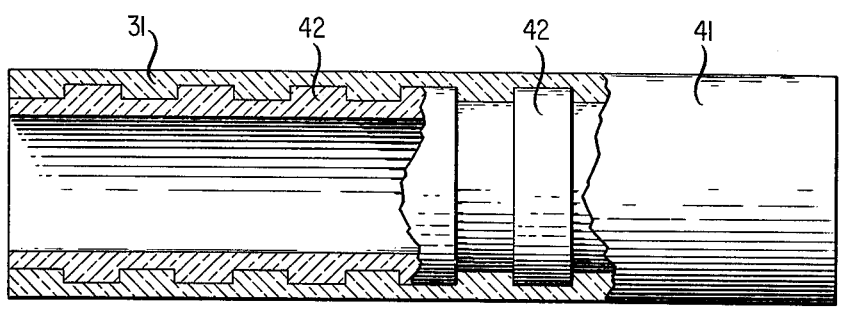
FIG. 4 is a representation of the structure shown in FIG. 3 on the interior of which additional glass has been deposited.
Figure 5:
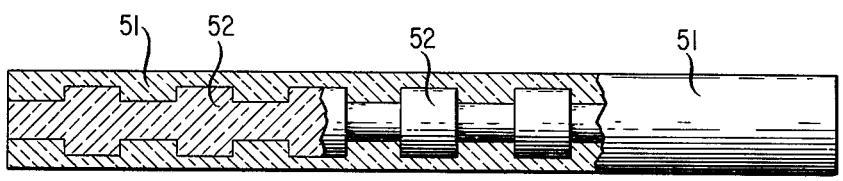
FIG. 5 represents the structure of FIG. 4 after it has been collapsed to form a solid optical fiber preform.

Subsequent to the formation of this structure, glass is deposited on the interior of the tube using any one of the prevalent glass deposition processes such as the chemical vapor deposition process, the modified chemical vapor deposition process, or the soot process. The structure then appears as shown in FIG. 4 where 31 is the grooved starting member of FIG. 3 and 42 is the additionally deposited glass. The additionallydeposited glass may have radial, longitudinal or azimuthal variations in index of refraction to further improve the transmission properties of the fiber. At this point the structure may be drawn directly into an optical fiber. However, for certain purposes it is preferable to collapse the hollow structure to a solid structure prior to pulling into an optical fiber. FIG. 5 is a representation of a structure such as that shown in FIG. 4 which has been collapsed to a solid optical fiber preform prior to being pulled into an optical fiber. In FIG. 5, 51 is the portion of the glass starting member which has been etched and which will form the fiber cladding. Fifty-two is the glass which has been additionally deposited on the interior wall of the starting member and which will ultimately form the transmitting core.

Figure 8:
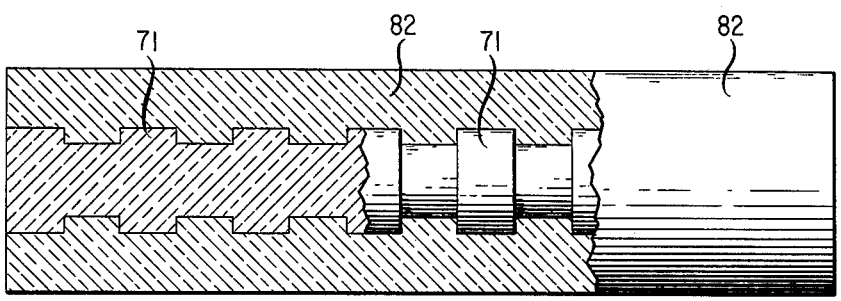
FIG. 8 is a representation of the structure shown in FIG. 7 on the exterior of which additional glass has been deposited.
Figure 9:
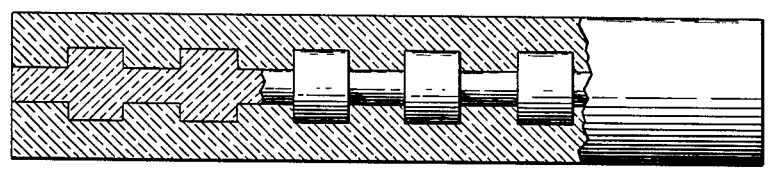
FIG. 9 is a representation of an optical fiber fabricated according to the teachings of this invention.
Figure 10:
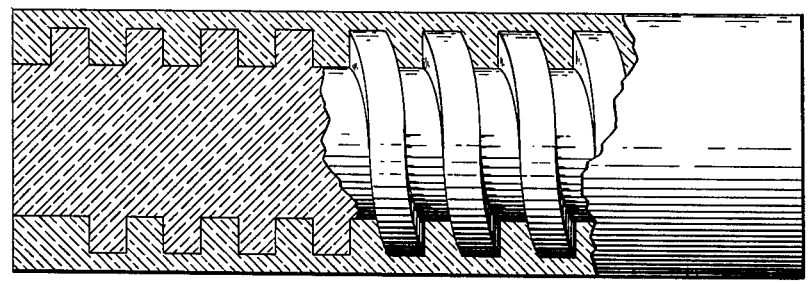
FIG. 10 is a representation of an optical fiber fabricated according to the teachings of this invention with a helical variation in the diameter of the transmitting core.

This invention may also be used when the starting member is a solid glass rod rather than a hollow glass tube. FIG. 6 is an apparatus which may be utilized to perform the initial etching steps when the starting member is a solid glass rod. In FIG. 6 the various elements are identified by the same numbers as in FIG. 1. Note that in FIG. 6 the resist 62 is applied to the outside wall of the solid rod 61, and is there exposed in a manner similar to that previously discussed. Subsequent to exposure the resist, either exposed or unexposed depending upon whether the resist is positive or negative, is removed, the underlying glass is etched, and then the remaining resist is removed. This yields a structure such as that shown in FIG. 7. In this figure, 71 represents the solid glass starting member and 72 represents the etched grooves. Additional glass is deposited on the exterior of this structure to yield a structure shown in FIG. 8. In FIG. 8, 71 is the etched starting member and 82 is the additionally deposited glass. After the preform is fabricated, it is pulled into a fiber using pulling techniques well known in the art and discussed, for example, in U.S. Pat. No. 3,865,564. FIG. 9 represents the fiber 90 formed using this invention. FIG. 10 is a representation of an optical fiber 91 produced using the teachings of this invention wherein the diameter variations are helical in nature.

While the above discussion has depicted a photoresist being exposed with a directed beam of light, this exposure may also proceed using interference techniques well known in the photoresist art. So, for example, two sources of light may be combined in such a manner that an interference pattern is projected onto the starting member thereby appropriately exposing the resist.

The above examples have been in terms of photoresist technology. However, it will be apparent to those skilled in the art that the invention may be practiced through the use of any pattern defining technique. So, for example, photolithography with contact printing as opposed to the projection printing displayed herein may be utilized. Likewise, this invention may be practiced through the use of the rapidly developing and much higher resolution electron beam technology. In such an event, resists appropriate for the particular pattern defining technique will be utilized.

The size and spacing of the grooves is very much dependent on the ratio between the length of the preform and the length of the fiber pulled from the preform. It is known that for optimal mode conversion the diameter variations in the fiber should be spaced between 0.5 millimeters and 50 millimeters from each other. Given this design criteria, one may easily extrapolate to the required prefrom groove spacing for any given pulling ratio. The pulling ratio is dependent on the particular pulling apparatus being used and will be known to the practitioner. With this knowledge, the specifications necessary for the practice of the instant invention may be determined.

Figure 7:
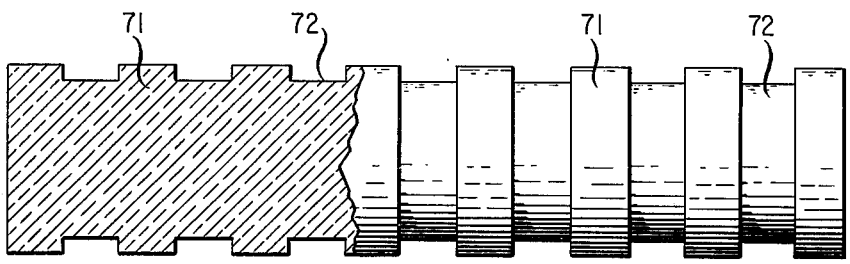
FIG. 7 is a representation of the solid rod starting member shown in FIG. 6 on the exterior of which grooves have been defined.

What is critical to this invention is that an etched starting member, such as those displayed in FIGS. 3 and 7, be fabricated. Such etched starting members may then be utilized in conjunction with standard glass deposition techniques to yield performs such as those displayed in FIGS. 5 and 8. Such preforms have transmitting cores with diameter variations but have uniform overall diameters. Optical fibers with this characteristic may be pulled in a single step from such performs without any additional diameter altering steps being required.

Figure 11:
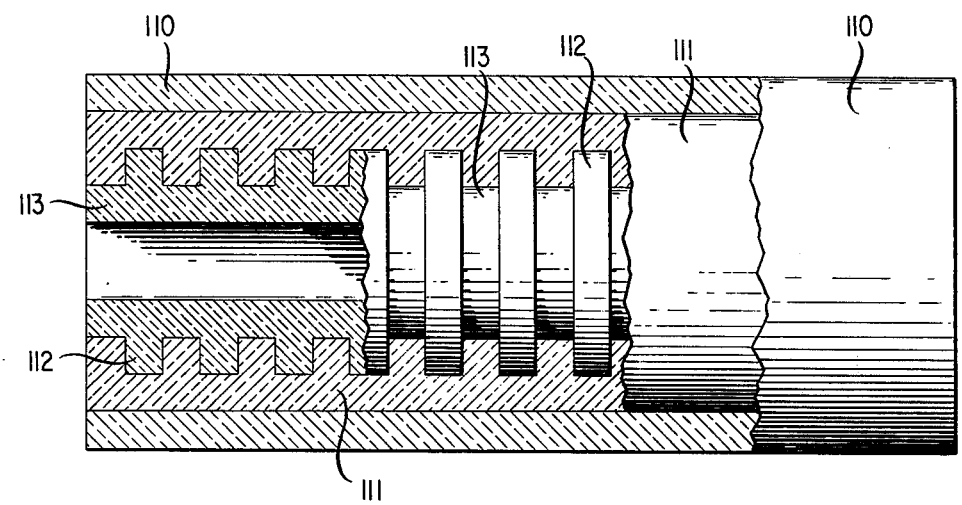
FIG. 11 is a representation of an alternative embodiment of this invention.

An alternative embodiment of this invention enables the practitioner to fabricate fibers, similar to that disclosed by D. Marcuse in U.S. Pat. No. 3,909,110, which have further improved mode mixing properties. In such fibers the core region has longitudinally varying radial gradations which are limited to a region in the core below a maximum radius $r_{max}$ in the core. Such a fiber may be fabricated by means of the instant invention, as shown in FIG. 11. In this figure the starting member is a hollow cylindrical glass tube 110. Core material 111 is deposited on the inner surface of the tube and etched with grooves 112 whose depth is less than that of the core material 111. The grooves are etched as previously discussed. If found desirable, the core material may have radial or azimuthal variations in composition as discussed by Marcuse. Additional core material 113 is deposited which may likewise have additional compositional variations. The preform so fabricated is drawn into a fiber as previously discussed.

EXAMPLE

An optical fiber is fabricated using the above-described process. The preform from which the fiber is drawn comprises a silica core and a borosilicate cladding. The preform diameter is 8 millimeters while the silica core is 4 millimeters in diameter. The grooves on the silica core starting member are defined using a photoresist exposed with an appropriate laser. The subsequently etched grooves are 4 microns deep and approximately 4 microns wide yielding a 0.1 percent variation in the diameter of the transmitting core. The grooves occur every 4 microns. The preform is drawn into a fiber using a laser drawing apparatus. The pulling ratio is 1,000 yielding a groove periodicity of 4 millimeters in the fiber. Periodic variations in the overall fiber diameter of periods greater than 0.01 millimeters are less than 5 percent of the overall diameter.

What is claimed is:

1. A method for producing clad optical fibers with diameter variations in the transmitting core, but with uniform overall diameter, comprising:
    etching grooves around a cylindrical glass starting member, which grooves are approximately perpendicular to the axis of the starting member and with a periodicity between 0.5/R mm and 50/R mm;
    depositing additional glass on the etched starting member to form a glass member of uniform overall diameter; and
    drawing the structure so formed into a fiber.

2. The method of claim 1 wherein the starting member is a hollow glass cylinder and the grooves are etched on the interior of the said cylinder.

3. The method of claim 2 wherein material is deposited on the etched glass cylinder using a modified chemical vapor deposition technique.

4. The method of claim 1 in which the starting member is a solid glass cylinder and grooves are etched on the exterior of the said cylinder.

5. The method of claim 4 wherein glass is formed on the etched cylinder using the soot deposition technique.

6. The method of claim 1 in which the etching proceeds by:
    depositing a resist on the glass cylinder,
    exposing the resist appropriately,
    developing the resist,
    removing partially the resist,
    etching the underlying glass, and
    removing the remaining resist.

7. The method of claim 1 wherein the resist is a photoresist.

8. The method of claim 7 wherein the photoresist is exposed using a laser.

9. The method of claim 7 wherein the photoresist is exposed using an interference pattern.

10. The method of claim 1 wherein the resist is an electron beam resist which is exposed with an appropriate electron beam.

11. The method of claim 1 wherein the starting member includes a layer of glass suitable for use in the fiber core, which layer of glass is etched with grooves whose depth is less than the thickness of the said layer of glass.

12. The method of claim 1 wherein at least a portion of the core material has radial, azimuthal or longitudinal variations in index of refraction, or combinations thereof.

* * * * *